US011094937B2

(12) United States Patent
Lee et al.

(10) Patent No.: US 11,094,937 B2
(45) Date of Patent: Aug. 17, 2021

(54) NEGATIVE ELECTRODE AND SECONDARY BATTERY INCLUDING THE SAME

(71) Applicant: LG CHEM, LTD., Seoul (KR)

(72) Inventors: Jung Pil Lee, Daejeon (KR); Hee Won Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 23 days.

(21) Appl. No.: 15/771,276

(22) PCT Filed: Jul. 14, 2017

(86) PCT No.: PCT/KR2017/007610
§ 371 (c)(1),
(2) Date: Apr. 26, 2018

(87) PCT Pub. No.: WO2018/012940
PCT Pub. Date: Jan. 18, 2018

(65) Prior Publication Data
US 2018/0316013 A1    Nov. 1, 2018

(30) Foreign Application Priority Data
Jul. 15, 2016 (KR) .................. 10-2016-0089735
Jul. 13, 2017 (KR) .................. 10-2017-0089109

(51) Int. Cl.
*H01M 4/583* (2010.01)
*H01M 4/13* (2010.01)
(Continued)

(52) U.S. Cl.
CPC ......... *H01M 4/583* (2013.01); *H01M 4/0404* (2013.01); *H01M 4/13* (2013.01);
(Continued)

(58) Field of Classification Search
CPC . H01M 4/366; H01M 10/052; H01M 10/0525
See application file for complete search history.

(56) References Cited

U.S. PATENT DOCUMENTS

| 8,048,563 B2 | 11/2011 | Konishiike et al. |
| 8,877,376 B2 | 11/2014 | Wakizaka et al. |
(Continued)

FOREIGN PATENT DOCUMENTS

| CN | 102473898 A | 5/2012 |
| CN | 103367702 A | 10/2013 |
(Continued)

OTHER PUBLICATIONS

JP-2010238426-A Original and Translation from Espacenet.*
(Continued)

*Primary Examiner* — Nathanael T Zemui
(74) *Attorney, Agent, or Firm* — Morgan, Lewis & Bockius LLP (57) ABSTRACT

The present invention relates to a negative electrode and a secondary battery including the same, and particularly, to a negative electrode which includes a current collector; a first active material layer disposed on the current collector and including at least one concave portion exposing a portion of the current collector; a stress-relaxing portion disposed in the concave portion; and a second active material layer disposed on the first active material layer and the stress-relaxing portion and separated from the current collector, and a secondary battery including the same.

17 Claims, 2 Drawing Sheets

(51) Int. Cl.
*H01M 4/36* (2006.01)
*H01M 4/139* (2010.01)
*H01M 4/62* (2006.01)
*H01M 4/04* (2006.01)
*H01M 4/1391* (2010.01)
*H01M 50/44* (2021.01)
*H01M 50/411* (2021.01)
*H01M 10/052* (2010.01)
*H01M 10/0569* (2010.01)
*H01M 10/44* (2006.01)
*H01M 4/02* (2006.01)
*H01M 4/587* (2010.01)
*H01M 4/485* (2010.01)
*H01M 4/505* (2010.01)
*H01M 4/66* (2006.01)

(52) U.S. Cl.
CPC ......... *H01M 4/139* (2013.01); *H01M 4/1391* (2013.01); *H01M 4/366* (2013.01); *H01M 4/622* (2013.01); *H01M 4/623* (2013.01); *H01M 10/052* (2013.01); *H01M 10/0569* (2013.01); *H01M 10/44* (2013.01); *H01M 50/411* (2021.01); *H01M 50/44* (2021.01); *H01M 4/485* (2013.01); *H01M 4/505* (2013.01); *H01M 4/587* (2013.01); *H01M 4/661* (2013.01); *H01M 2004/027* (2013.01)

(56) References Cited

U.S. PATENT DOCUMENTS

| | | | |
|---|---|---|---|
| 9,362,550 B2 | 6/2016 | Satow et al. | |
| 2010/0003544 A1 | 1/2010 | Pijnenburg et al. | |
| 2011/0136017 A1* | 6/2011 | Singh | H01M 4/134 429/311 |
| 2012/0107690 A1* | 5/2012 | Wakizaka | H01M 4/621 429/217 |
| 2012/0121983 A1 | 5/2012 | Yoon et al. | |
| 2014/0004418 A1* | 1/2014 | Kobayashi | H01M 4/0404 429/211 |
| 2014/0287316 A1 | 9/2014 | Ahn et al. | |
| 2014/0308582 A1 | 10/2014 | Satow et al. | |
| 2015/0017531 A1* | 1/2015 | Chung | H01M 4/622 429/217 |
| 2015/0340679 A1* | 11/2015 | Shimura | H01M 2/1673 429/144 |
| 2016/0204428 A1 | 7/2016 | Sugawara | |
| 2017/0062812 A1* | 3/2017 | Kim | H01M 4/8896 |
| 2017/0125788 A1 | 5/2017 | Ahn et al. | |
| 2018/0261881 A1* | 9/2018 | Wang | H01M 4/661 |

FOREIGN PATENT DOCUMENTS

| | | | |
|---|---|---|---|
| CN | 104025342 A | | 9/2014 |
| JP | 2009-205903 A | | 9/2009 |
| JP | 2010-176980 A | | 8/2010 |
| JP | 2010-238426 A | | 10/2010 |
| JP | 2010238426 A | * | 10/2010 |
| JP | 2012-38528 A | | 2/2012 |
| JP | 2012-104274 A | | 5/2012 |
| JP | 2014-120404 A | | 6/2014 |
| KR | 10-2012-0049145 A | | 5/2012 |
| KR | 20120049145 A | * | 5/2012 |
| KR | 10-2016-0059408 A | | 5/2016 |
| WO | WO 2008/015593 A2 | | 2/2008 |
| WO | WO 2014/116029 A1 | | 7/2014 |

OTHER PUBLICATIONS

KR-20120049145-A Original and Translation from Espacenet.*
Extended European Search Report for European Application No. 17828010.3, dated Nov. 6, 2018.
International Search Report (PCT/ISA/210) issued in PCT/KR2017/007610, dated Dec. 12, 2017.
Office Action dated Jul. 3, 2020 issued by the Chinese Patent Office in corresponding Chinese patent application No. 201780003923.4.

* cited by examiner

NEGATIVE ELECTRODE AND SECONDARY BATTERY INCLUDING THE SAME

CROSS-REFERENCE TO RELATED APPLICATION

This application claims priority to and the benefit of Korean Patent Application No. 10-2016-0089735, filed on Jul. 15, 2016, and Korean Patent Application No. 10-2017-0089109, filed on Jul. 13, 2017, the disclosures of which are incorporated herein by reference in their entirety.

TECHNICAL FIELD

The present invention relates to a negative electrode and a secondary battery including the same, wherein the negative electrode may include a current collector; a first active material layer disposed on the current collector and including at least one concave portion indented toward the current collector; a stress-relaxing portion disposed in the concave portion; and a second active material layer disposed on the first active material layer and separated from the current collector.

BACKGROUND ART

With a rapid increase in the use of fossil fuels, there is an increasing demand for use of alternative energy or clean energy. The field of electricity generation and accumulation using an electrochemical reaction has been most actively studied to meet the increasing demand.

As a representative example of electrochemical devices using such electrochemical energy, secondary batteries are currently used and an application area thereof has gradually been increased. Recently, with an increase in development of technology and demand for portable devices, such as portable computers, mobile phones, cameras, and the like, demand for secondary batteries as energy sources is rapidly increasing. Among such secondary batteries, much research on lithium secondary batteries, which have high energy density, high operating voltage, a long cycle lifespan, and a low self-discharge rate, has been conducted, and such lithium secondary batteries are commercially available and widely used.

Generally, a secondary battery is composed of a positive electrode, a negative electrode, an electrolyte, and a separator. In the secondary battery, lithium ions emitted from a positive electrode active material are intercalated into a negative electrode active material such as a carbon particle through charging and the lithium ions are deintercalated through discharging. As lithium ions reciprocate between opposite electrodes as such, they transfer energy. Therefore, the secondary battery can be charged and discharged.

In order to manufacture a battery having high energy density, a negative electrode in a battery needs to have high capacity. Accordingly, transition metals of Group 14 and Group 15 and oxides thereof other than graphite have been used as a negative electrode active material. However, the volume of an active material layer including, the above materials is excessively expanded when being charged and discharged, and thus stress is excessively applied to an electrode current collector and an active material layer, resulting in deintercalation of active material particles or peeling of an active material layer. Therefore, the lifespan of a battery may be shortened or stability may be degraded.

In order to solve the above problem of deintercalation or peeling, a method of using a binder having high adhesion or introducing other additives has been proposed, but stress excessively applied to an electrode current collector and an active material layer is not removed.

Therefore, there is a need to develop a negative electrode capable of relaxing stress applied to an electrode current collector and an active material layer while maintaining high capacity.

DISCLOSURE

Technical Problem

It is an aspect of the present invention to provide a negative electrode capable of relaxing stress applied to an electrode current collector and an active material layer while maintaining high capacity.

Technical Solution

According to an embodiment of the present invention, there is provided a negative electrode which includes a current collector; a first active material layer disposed on the current collector and including at least one concave portion indented toward the current collector; a stress-relaxing portion disposed in the concave portion; and a second active material layer disposed on the first active material layer and separated from the current collector.

According to another embodiment of the present invention, there is provided a secondary battery including the above-described negative electrode.

Advantageous Effects

A negative electrode according to an embodiment of the present invention uses a transition metal, an alloy thereof, and an oxide of a transition metal and an alloy thereof as an active material, and thus a battery having high capacity can be manufactured. Also, a stress-relaxing portion is disposed in a concave portion of a first active material layer so that stress applied to a current collector and an active material layer can be relaxed, and thus deintercalation of active material particles and peeling of an active material layer can be prevented.

MODE OF THE INVENTION

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The terminology provided herein is merely used for the purpose of describing particular embodiments, and is not intended to be limiting of exemplary embodiments of the present invention. The singular forms "a," "an" and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof. Also, it should be understood that in this specification, when a component is referred to as being disposed "on" another component, two components may come in contact or may be disposed at a top and a bottom while being separated at a predetermined interval.

Figure 1:
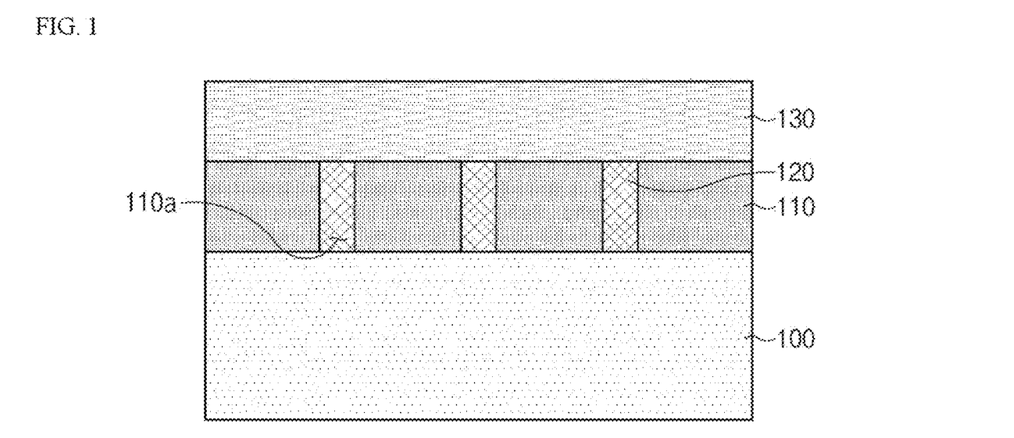
FIG. 1 is a cross-sectional schematic diagram of a negative electrode according to an embodiment of the present invention.

According to an embodiment of the present invention, referring to FIG. 1, a negative electrode may include a current collector 100; a first active material layer 110 disposed on the current collector 100 and including at least one concave portion 110a indented toward the current collector 100; a stress-relaxing portion 120 disposed in the concave portion 110a; and a second active material layer 130 disposed on the first active material layer 110 and separated from the current collector 100.

The current collector does not cause a chemical change in a secondary battery and has conductivity. For example, copper, stainless steel, aluminum, nickel, titanium, calcined carbon, aluminum or stainless steel whose surface is treated with carbon, nickel, titanium, silver, or the like may be used as the current collector.

The first active material layer may be disposed on the current collector, particularly, on one surface or both surfaces of the current collector. The first active material layer may include first active material particles and a first binder.

The first active material particle may be at least one active material particle selected from the group consisting of a graphite-based material, a transition metal, a transition metal oxide, an alloy of a transition metal, an oxide of an alloy of a transition metal, and a transition metal-containing composite. The graphite-based material may be at least one selected from the group consisting of artificial graphite, natural graphite, graphitized carbon fiber, and graphitized meso-carbon microbeads. The transition metal may be any one of transition metals of Group 14 and Group 15, particularly, any one of a silicon-based material, a tin-based material, and a germanium-based material. A transition metal included in the transition metal oxide, alloy of a transition metal, oxide of an alloy of a transition metal, and transition metal-containing composite may be the above-described transition metal. For example, when the transition metal is a silicon-based material, the first active material particle and a second active material particle each may be at least one selected from the group consisting of Si, SiOx (0<x<2), a Si—C composite, and a Si—Y alloy (here, Y is an element selected from the group consisting of alkali metals, alkaline earth metals, transition metals, Group 13 elements, Group 14 elements, rare-earth elements, and a combination thereof).

The first binder may include at least one of an aqueous binder and an organic binder. The first binder may be any of various types of binders such as polyvinylidene fluoride (PVDF), carboxymethyl cellulose (CMC), styrene-butadiene rubber (SBR), polyacrylonitrile, polymethyl methacrylate, polyvinyl alcohol, starches, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, fluoro rubber, a polymer in which hydrogen atoms of the above polymers are substituted with Li, Na, or Ca, and various copolymers, for example, a copolymer of at least one selected from the group consisting of polyvinylidene fluoride, carboxymethyl cellulose, and styrene-butadiene rubber with hexafluoropropylene (HFP) and the like.

The first active material layer may include at least one concave portion. The concave portion may be indented toward the current collector. Specifically, referring to FIG. 1, the concave portion may be indented to the current collector and pass through the first active material layer. That is, the concave portion may be indented as much as an entire thickness of the first active material layer toward the current collector. The concave portion may be in the form of a hole which is surrounded by the first active material layer. Alternatively, when the first active material layer includes two or more portions separated from each other, the concave portion may correspond to the separation space.

The concave portions may be formed at predetermined intervals or random intervals. Also, the concave portion may be formed in a predetermined shape or a random shape.

The stress-relaxing portion may be disposed in the concave portion. The stress-relaxing portion may partially or entirely fill the inside of the concave portion. Referring to FIG. 1, the stress-relaxing portion 120 of the negative electrode according to an embodiment of the present invention may entirely fill the concave portion 110a. When being disposed in the concave portion, the stress-relaxing portion may come in contact with the first active material layer. When the first active material layer includes two or more portions separated by the concave portion, one surface of the stress-relaxing portion may come in contact with one portion of the first active material layer, and the other surface of the stress-relaxing portion may come in contact with the other portion of the first active material layer.

The stress-relaxing portion absorbs stress generated due to the volume expansion of the first active material layer and the second active material layer when a battery is charged and discharged and thus may serve to relax stress applied to the current collector, the first active material layer, and the second active material layer. Accordingly, it is possible to prevent the deintercalation of first active material particles and second active material particles of a second active material layer to be described below and the peeling of the first active material layer and the second active material layer.

The stress-relaxing portion may include at least one of an aqueous polymer and an organic polymer.

The aqueous polymer may be at least one selected from the group consisting of poly(vinyl pyrrolidone), polyacrylamide, polyacrylic acid, poly(vinyl methyl ether), poly(propylene glycol), cellulose, poly(N-isopropylmethacrylamide), and polyethylene oxide. When the aqueous polymer is used in the stress-relaxing portion, the aqueous polymer is dispersed in an aqueous solvent to form the stress-relaxing portion. In this case, when an aqueous binder is used as a first binder of the first active material layer, the volume of the first active material layer is excessively expanded due to the aqueous solvent when the aqueous solvent is disposed in the concave portion, and thus stability of the first active material layer may be deteriorated. Therefore, when an organic binder is used as a first binder of the first active material layer, it is preferable that the stress-relaxing portion includes an aqueous polymer.

The organic polymer may be at least one selected from the group consisting of polystyrene, poly(methyl methacrylate), polyethylene, polypropylene, polyvinyl alcohol, polyvinyl chloride, polyimide, polyamide, polyamide imide, polyvinylidene fluoride, polyvinylidene fluoride-co-hexafluoropropylene (PVDF-co-HFP), polyvinylidene fluoride-co-trichloroethylene, polybutyl acrylate, polyacrylonitrile, polyvinyl acetate, polyethylene-co-vinyl acetate, polyethylene oxide, polyarylate, and a copolymer thereof. When the organic polymer is used, a change in an electrode structure upon coating of an electrode or wet etching in the manufacture of an aqueous negative electrode may be minimized. When the organic polymer is used in the stress-relaxing portion, the organic polymer is dispersed in an organic solvent to form the stress-relaxing portion. In this case, when an organic binder is used as a first binder of the first active material layer, the volume of the first active material layer is excessively expanded due to the organic solvent when the organic solvent is disposed in the concave portion, and thus stability of the first active material layer may be deteriorated. Therefore, when an aqueous binder is used as a first binder of the first active material layer, it is preferable that the stress-relaxing portion includes an organic polymer.

The stress-relaxing portion and the first active material layer may be included in a volume ratio of 1:99 to 50:50, particularly 5:95 to 30:70, and more particularly 10:90 to 20:80 in the negative electrode. When the stress-relaxing portion and the first active material layer are included within the above volume ratio, an effect of relaxing stress may be more excellent, and an excessive increase in electrode resistance may be prevented.

The stress-relaxing portion may have a quadrangular prism, cylindrical, conical, or pyramidal shape, but the present invention is not limited thereto.

The second active material layer may be disposed on the first active material layer. The second active material layer may cover the stress-relaxing portion. In this case, the second active material layer may come or may not come in contact with the stress-relaxing portion.

The second active material layer may be disposed separately from the current collector so that the first active material layer and the stress-relaxing portion are interposed therebetween. The second active material layer may serve to prevent the deintercalation of first active material particles and the deintercalation of components of the stress-relaxing portion. The second active material layer may include second active material particles and a second binder.

The second active material particle may be at least one active material particle selected from the group consisting of a graphite-based material, a transition metal, a transition metal oxide, an alloy of a transition metal, an oxide of an alloy of a transition metal, and a transition metal-containing composite. The graphite-based material may be at least one selected from the group consisting of artificial graphite, natural graphite, graphitized carbon fiber, and graphitized meso-carbon microbeads. The transition metal may be any one of transition metals of Group 14 and Group 15, particularly, any one of a silicon-based material, a tin-based material, and a germanium-based material. A transition metal included in the transition metal oxide, alloy of a transition metal, oxide of an alloy of a transition metal, and transition metal-containing composite may be the above-described transition metal. For example, when the transition metal is a silicon-based material, the first active material particle and the second active material particle each may be at least one selected from the group consisting of Si, SiOx (0<x<2), a Si—C composite, and a Si—Y alloy (here, Y is an element selected from the group consisting of alkali metals, alkaline earth metals, transition metals, Group 13 elements, Group 14 elements, rare-earth elements, and a combination thereof).

The second binder may be any of various types of binders such as polyvinylidene fluoride (PVDF), carboxymethyl cellulose (CMC), styrene-butadiene rubber (SBR), polyacrylonitrile, polymethyl methacrylate, polyvinyl alcohol, starches, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, fluoro rubber, a polymer in which hydrogen atoms of the above polymers are substituted with Li, Na, or Ca, and various copolymers, for example, a copolymer of at least one selected from the group consisting of polyvinylidene fluoride, carboxymethyl cellulose, and styrene-butadiene rubber with hexafluoropropylene (HFP) and the like.

The first active material layer and the second active material layer each may further include a conductive material. The conductive material is not particularly limited as long as it does not cause a chemical change in the battery and has conductivity. For example, graphite such as natural graphite, artificial graphite or the like; a carbon-based material such as carbon black, acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like may be used as the conductive material.

Figure 2:
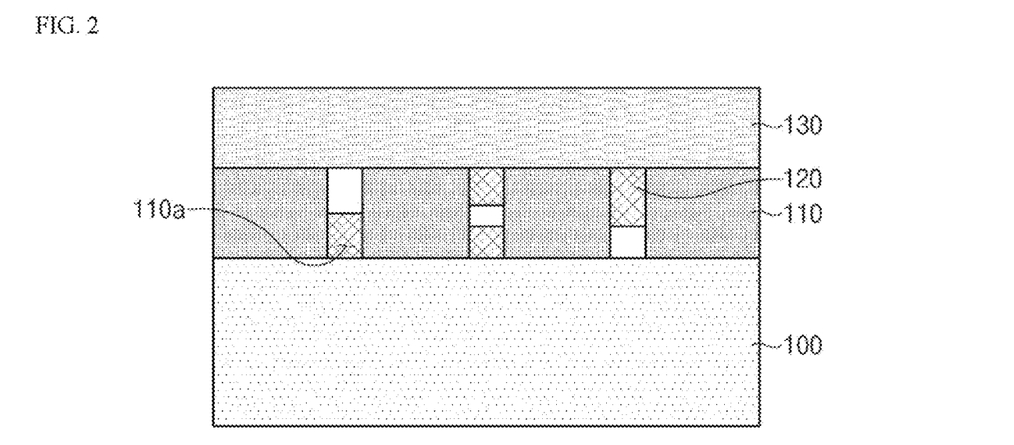
FIG. 2 is a cross-sectional schematic diagram of a negative electrode according to another embodiment of the present invention.

Referring to FIG. 2, a negative electrode according to another embodiment of the present invention is similar to the negative electrode according to an embodiment of the present invention described with reference to FIG. 1, but differs in that the stress-relaxing portion 120 partially fills the inside of the concave portion 110a. Hereinafter, the difference from the negative electrode according to an embodiment of the present invention described with reference to FIG. 1 will be mainly described.

Since a stress-relaxing portion of the negative electrode according to FIG. 2 only partially fills the concave portion, a region except a region which is filled with a stress-relaxing portion in the concave portion may be empty. The empty region ensures a region where a first active material layer and a second active material layer, whose volumes are expanded when a battery is charged and discharged, can be located, and thus may serve to reduce generation of stress caused by volume expansion. The stress-relaxing portion may come in contact with at least one of a first active material layer, a second active material layer, and a current collector.

Although not shown in FIG. 2, the negative electrode according to FIG. 2 may include not only a concave portion which is partially filled with the stress-relaxing portion but also a concave portion which is entirely filled with the stress-relaxing portion at the same time.

Figure 3:
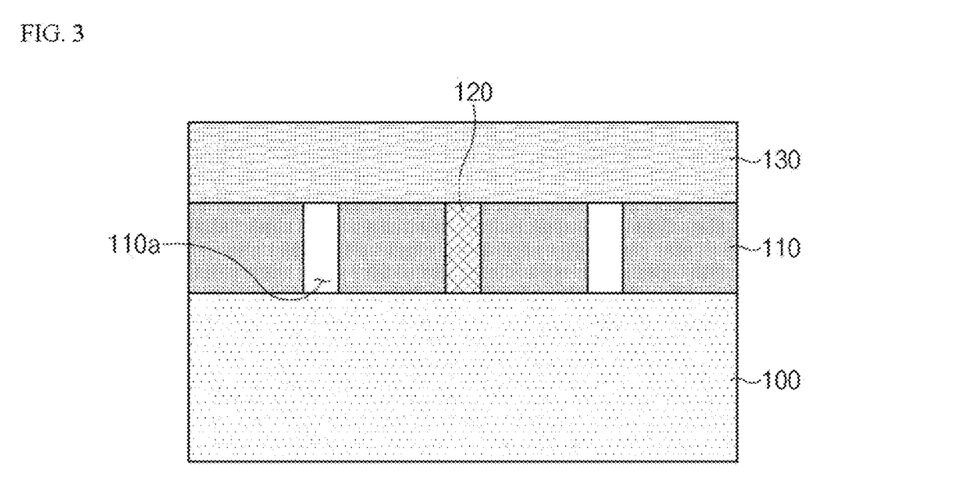
FIG. 3 is a cross-sectional schematic diagram of a negative electrode according to still another embodiment of the present invention.

Referring to FIG. 3, a negative electrode according to still another embodiment of the present invention is similar to the negative electrode according to an embodiment of the present invention described with reference to FIG. 1, but differs in that some parts of concave portions are not filled with a stress-relaxing portion. Hereinafter, the difference from the negative electrode according to an embodiment of the present invention described with reference to FIG. 1 will be mainly described.

The negative electrode according to FIG. 3 may include a plurality of concave portions, and the stress-relaxing portion may fill some parts of the plurality of concave portions. In this case, some parts of concave portions may refer to at least one portion. Accordingly, a concave portion which is not filled with a stress-relaxing portion ensures a region where a first active material layer and a second active material layer, whose volumes are expanded when a battery is charged and discharged, can be located, and thus may serve to reduce generation of stress caused by volume expansion. Also, a stress-relaxing portion which is disposed in some parts of concave portions absorbs stress generated due to the volume expansion of the first active material layer and the second active material layer when a battery is charged and discharged, and thus may serve to relax stress applied to the current collector, the first active material layer, and the second active material layer.

Figure 4:
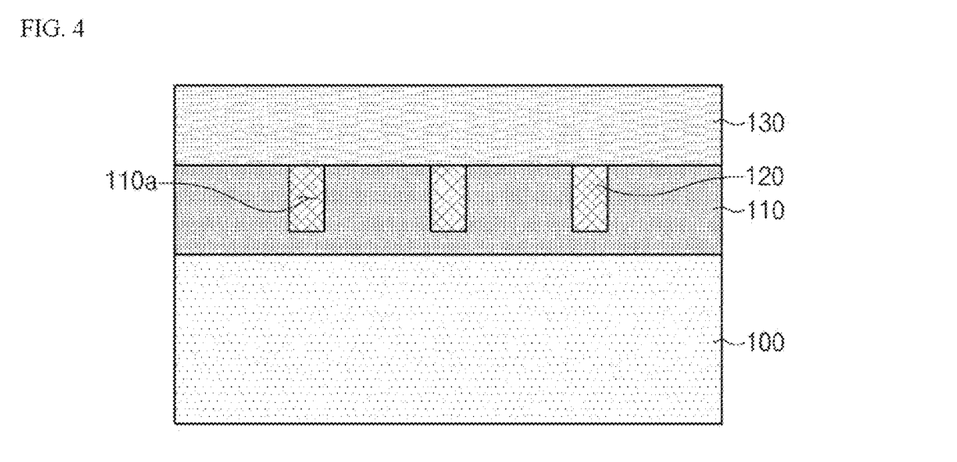
FIG. 4 is a cross-sectional schematic diagram of a negative electrode according to yet another embodiment of the present invention.

Referring to FIG. 4, a negative electrode according to yet another embodiment of the present invention is similar to the negative electrode according to an embodiment of the present invention described with reference to FIG. 1, but differs in that the concave portion does not pass through the first active material layer. Hereinafter, the difference from the negative electrode according to an embodiment of the present invention described with reference to FIG. 1 will be mainly described.

The concave portion may be indented toward the current collector, but the current collector and the concave portion may not be connected. Specifically, in a direction perpendicular to the current collector, the first active material layer may be disposed between the concave portion and the current collector. In this case, even while an effect of preventing the deintercalation of an active material caused by a stress-relaxing portion is maintained to some extent, a content of first active material particles may be maintained at a high level, and thus capacity of a battery may be further improved.

The negative electrodes according to embodiments of the present invention may be manufactured as follows.

A slurry for forming a first active material layer, prepared by mixing an electrode mixture including first active material particles, a binder, and a conductive material in a solvent, may be applied on a current collector, dried, and rolled to form a first active material layer. The first active material layer thus formed may be selectively etched through a mask to form at least one concave portion. Afterward, a stress-relaxing portion may be formed in the concave portion thus formed and then the mask may be removed. Here, the stress-relaxing portion may be formed by applying a slurry in which a material for forming a stress-relaxing portion is dispersed in a solvent, followed by drying. After the formation of the stress-relaxing portion, a slurry for forming a second active material layer, prepared by mixing an electrode mixture including second active material particles, a binder, and a conductive material in a solvent, may be applied on the first active material layer and the stress-relaxing portion, dried, and rolled to form a second active material layer. The first active material layer, the stress-relaxing portion, and the second active material layer may be formed by using at least one of screen printing, inkjet printing, spray printing, gravure printing, heat transfer printing, a Toppan printing method, intaglio printing, and offset printing. Also, the solvent used in the manufacture of the negative electrode may be a solvent generally used in the art, and may be one or a mixture of two or more of dimethyl sulfoxide (DMSO), isopropyl alcohol, N-methylpyrrolidone (NMP), acetone, water, and the like.

However, the present invention is not necessarily limited to the above-described manufacturing method. For example, the first active material layer and the concave portion may be formed by another method. Unlike the above-described method, a mask may be disposed on a current collector before application of the slurry for forming a first active material layer, and then the slurry may be applied, dried, and rolled to form a first active material layer. Afterward, the mask may be removed to form a concave portion.

A negative electrode in which a concave portion is only partially filled with a stress-relaxing portion may be manufactured as follows. There is no difference in that a first active material layer and a concave portion are formed in the same manner as described above. However, before the formation of the stress-relaxing portion or after the formation of the stress-relaxing portion in only a portion of the concave portion, polymers such as polymethyl methacrylate, polyethylene, polyethyloxide, and the like may fill the remaining portion of the concave portion. Afterward, a second active material layer is formed in the same manner as described above, and then the polymers may be removed through wet etching or the like to manufacture the negative electrode in such a way that a concave portion has an empty space.

As a similar method, some parts of a plurality of concave portions are filled with only the polymer rather than the stress-relaxing portion. Afterward, a second active material layer is formed, and then the polymer may be removed in the same manner as described above. Accordingly, an empty concave portion which is not filled with the stress-relaxing portion may be formed.

According to another embodiment of the present invention, a secondary battery may include a negative electrode, a positive electrode, a separator interposed between the positive electrode and the negative electrode, and an electrolyte, wherein the negative electrode may be the negative electrode according to an embodiment of the present invention.

The positive electrode may include a positive electrode current collector and a positive electrode active material layer formed on the positive electrode current collector and including a positive electrode active material.

In the positive electrode, the positive electrode current collector is not particularly limited as long as it does not cause a chemical change in the battery and has conductivity. For example, stainless steel, aluminum, nickel, titanium, calcined carbon, or aluminum or stainless steel whose surface is treated with carbon, nickel, titanium, silver or the like may be used as the positive electrode current collector. Also, the positive electrode current collector may commonly have a thickness of 3 to 500 and may have fine irregularities at a surface thereof to increase adhesion of the positive electrode active material. For example, the positive electrode current collector may be used in any of various forms such as a film, a sheet, a foil, a net, a porous material, a foam, a non-woven fabric, and the like.

The positive electrode active material may be a commonly used positive electrode active material. Specifically, the positive electrode active material may be a layered compound such as a lithium cobalt oxide ($LiCoO_2$), a lithium nickel oxide ($LiNiO_2$) or the like, or a compound substituted with one or more transition metals; a lithium iron oxide such as $LiFe_3O_4$ or the like; a lithium manganese oxide such as a compound represented by $Li_{1+c1}Mn_{2-c1}O_4$ ($0 \leq c1 \leq 0.33$), $LiMnO_3$, $LiMn_2O_3$, $LiMnO_2$, or the like; a lithium copper oxide such as $Li_2CuO_2$; a vanadium oxide such as $LiV_3O_8$, $V_2O_5$, $Cu_2V_2O_7$ or the like; a Ni site-type lithium nickel oxide represented by $LiNi_{1-c2}M_{c2}O_2$ (here, M is at least one selected from the group consisting of Co, Mn, Al, Cu, Fe, Mg, B, and Ga, and $0.01 \leq c2 \leq 0.3$); a lithium manganese composite oxide represented by $LiMn_{2-c3}M_{c3}O_2$ (here, M is at least one selected from the group consisting of Co, Ni, Fe, Cr, Zn, and Ta, and $0.01 \leq c3 \leq 0.1$) or $Li_2Mn_3MO_8$ (here, M is at least one selected from the group consisting of Fe, Co, Ni, Cu, and Zn); or $LiMn_2O_4$ in which some Li ions in the chemical formulas are substituted with alkaline earth metal ions, but the present invention is not limited thereto. The positive electrode may be Li metal.

The positive electrode active material layer may include a positive electrode conductive material and a positive electrode binder in addition to the above-described positive electrode active material.

In this case, the positive electrode conductive material is a component for imparting the conductivity to the electrode and is not particularly limited as long as it does not cause a chemical change in the battery and has electronic conductivity. For example, one or a mixture of two or more of graphite such as natural graphite, artificial graphite or the like; a carbon-based material such as carbon black, acetylene black, Ketjen black, channel black, furnace black, lamp black, thermal black, carbon fiber or the like; metallic powder or metallic fiber including copper, nickel, aluminum, silver, or the like; a conductive whisker such as zinc oxide, potassium titanate or the like; a conductive metal oxide such as titanium oxide or the like; and a conductive polymer such as a polyphenylene derivative or the like may be used as the positive electrode conductive material.

In addition, the positive electrode binder serves to improve cohesion between positive electrode active material particles and adhesion between a positive electrode active material and a positive electrode current collector. For example, one or a mixture of two or more of polyvinylidene fluoride (PVDF), polyvinylidene fluoride-co-hexafluoropropylene (PVDF-co-HFP), polyvinyl alcohol, polyacrylonitrile, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene monomer (EPDM), a sulfonated EPDM, styrene-butadiene rubber (SBR), fluororubber, various copolymers thereof, and the like may be used as the positive electrode binder.

The separator serves to separate the negative electrode and the positive electrode and provide a flow passage for lithium ions. The separator is not particularly limited as long as it is used as a separator in a common secondary battery, and particularly, a separator which exhibits low resistance to migration of electrolyte ions and has an excellent ability of absorbing an electrolyte is preferable. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof may be used as the separator. Alternatively, a common porous non-woven fabric, for example, a non-woven fabric made of glass fiber with a high melting point, polyethylene terephthalate fiber or the like may be used as the separator. Also, in order to ensure heat resistance or mechanical strength, a coated separator including ceramic components or polymer materials may be used, and the separator may have a single-layer or multi-layer structure.

The electrolyte may be an organic liquid electrolyte, an inorganic liquid electrolyte, a solid polymer electrolyte, a gel-type polymer electrolyte, an inorganic solid electrolyte, a molten-type inorganic electrolyte or the like, which may be used in the manufacture of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, an ether, methyl propionate, ethyl propionate, or the like may be used.

Particularly, among the carbonate-based organic solvents, ethylene carbonate and propylene carbonate, which are cyclic carbonate compounds, are preferably used because they are high-viscosity organic solvents and dissociate a lithium salt effectively due to their high dielectric constant. It is more preferable that such a cyclic carbonate compound is used in combination with a linear carbonate compound having low viscosity and a low dielectric constant such as dimethyl carbonate and diethyl carbonate in an appropriate ratio because an electrolyte having high electric conductivity may be formed.

The metal salt may be a lithium salt, which is a material that is readily soluble in the non-aqueous electrolyte. For example, the lithium salt may include, as an anion, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like.

According to another embodiment of the present invention, there are provided a battery module including the secondary battery as a unit cell and a battery pack including the same. Since the battery module and the battery pack include the secondary battery which has high capacity, rate characteristics, and cycle characteristics, the battery pack may be used as a power source for medium- to large-sized devices selected from the group consisting of an electric vehicle, an hybrid electric vehicle, a plug-in hybrid electric vehicle, and a power storage system.

BEST MODE

Hereinafter, preferred embodiments of the present invention will be described in order to aid in understanding the present invention. However, it is apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided they are within the scope of the appended claims and their equivalents.

EXAMPLES AND COMPARATIVE EXAMPLES

Preparation Example 1: Preparation of Slurry for Forming First Active Material Layer 94 wt % of a silicon particle (commercially available from Shin-Etsu Chemical Co., Ltd) having an average particle size ($D_{50}$) of 4.9 μm as a first active material particle, 1.5 wt % of Super P as a conductive material, and 3 wt % of styrene-butadiene rubber (SBR) and 1.5 wt % of carboxymethyl cellulose (CMC) as binders were mixed, and then water as a solvent was added to prepare a slurry for forming a first active material layer.

Preparation Example 2: Preparation of Slurry for Forming Second Active Material Layer 95.8 wt % of carbon powder having an average particle size ($D_{50}$) of 12 μm as a second active material particle, 0.5 wt % of Super P as a conductive material, and 2.5 wt % of styrene-butadiene rubber (SBR) and 1.2 wt % of carboxymethyl cellulose (CMC) as binders were mixed, and then water as a solvent was added to prepare a slurry for forming a second active material layer.

Example 1: Manufacture of Battery (1) Manufacture of Negative Electrode
1) Formation of First Active Material Layer
The slurry for forming a first active material layer prepared in Preparation Example 1 was applied on a copper thin film having a thickness of 20 μm, which is a negative electrode current collector, dried, and roll-pressed to form a first active material layer having a thickness of 18 μm and a loading amount of 2.1 mAh/cm².
2) Formation of Stress-Relaxing Portion
The first active material layer was partially etched through lithography to remove about 30% of the volume of the first active material layer. Afterward, a solution in which polyvinylidene fluoride (PVDF) was dissolved at a concentration of 2.5 wt % in N-methylpyrrolidone (NMP) was applied on the etched portion and dried to form a stress-relaxing portion. In this case, the stress-relaxing portion entirely filled the inside of the etched portion.
3) Formation of Second Active Material Layer
The slurry for forming a second active material layer was applied on the first active material layer and the stress-relaxing portion, dried, and then roll-pressed to form a second active material layer having a thickness of 20 μm and a loading amount of 0.3 mAh/cm², thereby manufacturing a negative electrode.
(2) Manufacture of Battery
As a counter electrode, Li metal was used. A polyolefin separator was interposed between the negative electrode and the Li metal to prepare an electrode assembly. Meanwhile, vinylene carbonate (VC) was dissolved at a concentration of 0.5 wt % in a mixed solution in which ethylene carbonate (EC) and ethyl methyl carbonate (EMC) were mixed in a volume ratio of 7:3, and $LiPF_6$ was dissolved at a concentration of 1 M to prepare an electrolyte. The electrolyte was injected into the electrode assembly to manufacture a coin-type half-cell.

Example 2: Manufacture of Battery (1) Manufacture of Negative Electrode and Battery
A coin-type half-cell of Example 2 was manufactured in the same manner as in Example 1 except that a solution, in which polyvinylidene fluoride (PVDF) was dissolved at a concentration of 1 wt % in N-methylpyrrolidone (NMP), was used when a stress-relaxing portion was formed. In this case, a negative electrode had a structure in which the stress-relaxing portion partially filled the inside of the etched portion.

Example 3: Manufacture of Battery (1) Manufacture of Negative Electrode
1) Formation of First Active Material Layer
A first active material layer was formed in the same manner as in Example 1.
2) Formation of Stress-Relaxing Portion
The first active material layer was partially etched through lithography to remove about 15% of the volume of the first active material layer. Afterward, a solution in which polyvinylidene fluoride (PVDF) was dissolved at a concentration of 2.5 wt % in N-methylpyrrolidone (NMP) was applied on the etched portion and dried to form a stress-relaxing portion. Then, a portion, which was not etched in the first active material layer, was etched through lithography to additionally remove about 15% of the volume of the first active material layer.
3) Formation of Second Active Material Layer
A second active material layer was formed in the same manner as in Example 1.
(2) Manufacture of Battery
A coin-type half-cell of Example 3 was manufactured in the same manner as in Example 1.

Comparative Example 1: Manufacture of Battery (1) Manufacture of Negative Electrode
94 wt % of an active material in which silicon particles (commercially available from Shin-Etsu Chemical Co., Ltd) having an average particle size ($D_{50}$) of 4.9 μm and carbon powder having an average particle size ($D_{50}$) of 12 μm were mixed in a weight ratio of 1:1, 1.5 wt % of Super P as a conductive material, and 3 wt % of styrene-butadiene rubber (SBR) and 1.5 wt % of carboxymethyl cellulose (CMC) as binders were mixed, and then water as a solvent was added to prepare a negative electrode slurry.
The negative electrode slurry was applied on a copper thin film having a thickness of 20 μm, which is a negative electrode current collector, dried, and roll-pressed to manufacture a negative electrode including an active material layer having a thickness of 38 μm and a loading amount of 1.7 mAh/cm².

(2) Manufacture of Battery

As a counter electrode, Li metal was used. A polyolefin separator was interposed between the negative electrode and the Li metal to prepare an electrode assembly. Meanwhile, vinylene carbonate (VC) was dissolved at a concentration of 0.5 wt % in a mixed solution in which ethylene carbonate (EC) and ethyl methyl carbonate (EMC) were mixed in a volume ratio of 7:3, and $LiPF_6$ was dissolved at a concentration of 1 M to prepare an electrolyte. The electrolyte was injected into the electrode assembly to manufacture a coin-type half-cell.

Comparative Example 2: Manufacture of Battery (1) Manufacture of Negative Electrode
1) Formation of First Active Material Layer The slurry for forming a first active material layer prepared in Preparation Example 1 was applied on a copper thin film having a thickness of 20 μm, which is a negative electrode current collector, dried, and roll-pressed to form a first active material layer having a thickness of 18 μm and a loading amount of 1.4 mAh/cm².

2) Formation of Second Active Material Layer

The slurry for forming a second active material layer was applied on the first active material layer, dried, and then roll-pressed to form a second active material layer having a thickness of 20 μm and a loading amount of 0.3 mAh/cm², thereby manufacturing, a negative electrode.

(2) Manufacture of Battery

As a counter electrode, Li metal was used. A polyolefin separator was interposed between the negative electrode and the Li metal to prepare an electrode assembly. Meanwhile, vinylene carbonate (VC) was dissolved at a concentration of 0.5 wt % in a mixed solution in which ethylene carbonate (EC) and ethyl methyl carbonate (EMC) were mixed in a volume ratio of 7:3, and $LiPF_6$ was dissolved at a concentration of 1 M to prepare an electrolyte. The electrolyte was injected into the electrode assembly to manufacture a coin-type half-cell.

Experimental Example 1

For each of the batteries according to Examples 1 to 3 and Comparative Examples 1 and 2, a cycle characteristic was evaluated. Charging and discharging were performed at 0.1 C in $1^{st}$ and $2^{nd}$ cycles and at 0.5 C in $3^{rd}$ to $30^{th}$ cycles. Afterward, discharge capacities after $10^{th}$ and $30^{th}$ cycles with respect to discharge capacity after a $1^{st}$ cycle were evaluated, results of which are shown in Table 1.

Charging condition: Constant current (CC)/constant voltage (CV) (5 mV/0.005 C current cut-off)

Discharging condition: Constant current (CC) 1.5 V condition

TABLE 1

| | Discharge capacity after $10^{th}$ cycle (%) | Discharge capacity after $30^{th}$ cycle (%) |
| --- | --- | --- |
| Example 1 | 95.2 | 87.1 |
| Example 2 | 95.7 | 88.9 |
| Example 3 | 96.1 | 90.3 |
| Comparative Example 1 | 94.5 | 81.7 |
| Comparative Example 2 | 94.9 | 82.9 |

Referring to Table 1, the batteries according to Examples 1 to 3 exhibited excellent cycle characteristics compared to the batteries according to Comparative Examples 1 and 2. This is considered to be due to the fact that stress generated in the active material layer upon charging and discharging is relaxed by the stress-relaxing portion.

Meanwhile, it can be confirmed that Example 2 in which an etched portion (corresponding to the concave portion described in the detailed description) was only partially filled with a stress-relaxing portion and Example 3 in which some parts of the etched portions did not include a stress-relaxing portion exhibited a more excellent effect of relaxing stress.

The invention claimed is:

1. A negative electrode comprising:
   a current collector;
   a first active material layer disposed on the current collector and including at least two different types of concave portions indented toward the current collector wherein the at least two types of concave portions includes a first type of concave portion and a second type of concave portion;
   a stress-relaxing portion disposed in the first type of concave portion and the second type of concave portion being present as a void; and
   a second active material layer disposed on the first active material layer and separated from the current collector
   wherein the stress-relaxing portion is a material, which comprises at least one of an aqueous polymer or an organic polymer,
   wherein the aqueous polymer includes at least one selected from the group consisting of poly(vinyl pyrrolidone), polyacrylamide, polyacrylic acid, poly(vinyl methyl ether), poly(propylene glycol), cellulose, and poly(N-isopropylmethacrylamide), and
   wherein the organic polymer includes at least one selected from the group consisting of polystyrene, poly(methyl methacrylate), polyethylene, polypropylene, polyvinyl alcohol, polyvinyl chloride, polyimide, polyamide, polyamide imide, polyvinylidene fluoride, polyvinylidene fluoride-co-hexafluoropropylene (PVDF-co-HFP), polyvinylidene fluoride-co-trichloroethylene, polybutyl acrylate, polyvinyl acetate, polyethylene-co-vinyl acetate, polyarylate, and a copolymer thereof, and
   wherein the first type of concave portion extends from a bottom surface of the second active material layer to a top surface of the current collector, and the second type of concave portion extends from a bottom surface of the second active material layer to a top surface of the current collector.

2. The negative electrode of claim 1, wherein the second active material layer covers the stress-relaxing portion.

3. The negative electrode of claim 1, wherein the stress-relaxing portion and the first active material layer are included in a volume ratio of 1:99 to 50:50.

4. The negative electrode of claim 1, wherein the stress-relaxing portion partially or entirely fills the inside of the first type of concave portion.

5. The negative electrode of claim 1, wherein the first active material layer is disposed between the concave portion and the current collector.

6. The negative electrode of claim 1, wherein:
   the first active material layer includes first active material particles and a first binder;
   the second active material layer includes second active material particles and a second binder; and the first active material particle and the second active material particle each independently are at least one active material particle selected from the group consisting of a graphite-based material, a transition metal, a transition metal oxide, an alloy of a transition metal, an oxide of an alloy of a transition metal, and a transition metal-containing composite.

7. A secondary battery comprising:
the negative electrode according to claim 1;
a positive electrode; a separator interposed between the positive electrode and the negative electrode; and
an electrolyte.

8. The negative electrode of claim 6, wherein the first binder comprises an aqueous binder and the stress-relaxing portion comprises the organic polymer.

9. The negative electrode of claim 6, wherein the first binder comprises an organic binder and the stress-relaxing portion comprises the aqueous polymer.

10. The negative electrode of claim 6, wherein the first binder comprises at least one selected from the group consisting of polyvinylidene fluoride, carboxymethyl cellulose, styrene-butadiene rubber, polyacrylonitrile, polymethyl methacrylate, polyvinyl alcohol, starches, hydroxypropyl cellulose, regenerated cellulose, polyvinyl pyrrolidone, tetrafluoroethylene, polyethylene, polypropylene, polyacrylic acid, an ethylene-propylene-diene monomer, a sulfonated EPDM, and fluoro rubber.

11. The negative electrode of claim 6, wherein the first binder comprises a copolymer of at least one selected from the group consisting of polyvinylidene fluoride, carboxymethyl cellulose, and styrene-butadiene rubber with hexafluoropropylene.

12. The negative electrode of claim 6, wherein the first binder comprises the aqueous binder including carboxymethyl cellulose, the stress-relaxing portion comprises the organic polymer including polyvinylidene fluoride.

13. The negative electrode of claim 1, wherein the stress-relaxing portion partially fills the inside of the first type of concave portion.

14. The negative electrode of claim 1, wherein:
the first active material layer includes first active material particles and a first binder;
the second active material layer includes second active material particles and a second binder; and
the first active material particle and the second active material particle each comprise at least one selected from the group consisting of Si, SiOx (0<x<2), a Si—C composite, and a Si—Y alloy, wherein Y is an element selected from the group consisting of alkali metals, alkaline earth metals, transition metals, Group 13 elements, Group 14 elements, rare-earth elements, and a combination thereof.

15. A negative electrode comprising:
a current collector;
a first active material layer disposed on the current collector and including at least two different types of concave portions indented toward the current collector wherein the at least two types of concave portions includes a first type of concave portion and a second type of concave portion;
a stress-relaxing portion disposed in the first type of concave portion and the second type of concave portion being present as a void; and
a second active material layer disposed on the first active material layer and separated from the current collector,
wherein the stress-relaxing portion is a material, which comprises at least one of an aqueous polymer or an organic polymer, and
wherein the first type of concave portion extends from a bottom surface of the second active material layer to a top surface of the current collector, and the second type of concave portion extends from a bottom surface of the second active material layer to a top surface of the current collector.

16. The negative electrode of claim 15, wherein the aqueous polymer includes at least one selected from the group consisting of poly(vinyl pyrrolidone), polyacrylamide, polyacrylic acid, poly(vinyl methyl ether), poly(propylene glycol), cellulose, and poly(N-isopropylmethacrylamide).

17. The negative electrode of claim 15, wherein the organic polymer includes at least one selected from the group consisting of polystyrene, poly(methyl methacrylate), polyethylene, polypropylene, polyvinyl alcohol, polyvinyl chloride, polyimide, polyamide, polyamide imide, polyvinylidene fluoride, polyvinylidene fluoride-co-hexafluoropropylene (PVDF-co-HFP), polyvinylidene fluoride-co-trichloroethylene, polybutyl acrylate, polyvinyl acetate, polyethylene-co-vinyl acetate, polyarylate, and a copolymer thereof.

* * * * *